June 17, 1969
J. C. NORWOOD
3,450,175
BOTTLE FILLER TUBE
Filed July 28, 1966
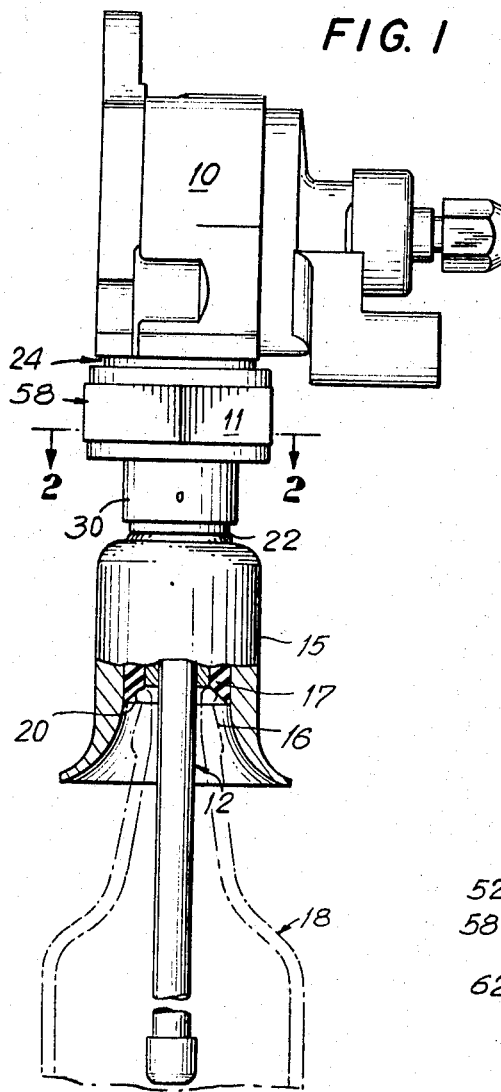
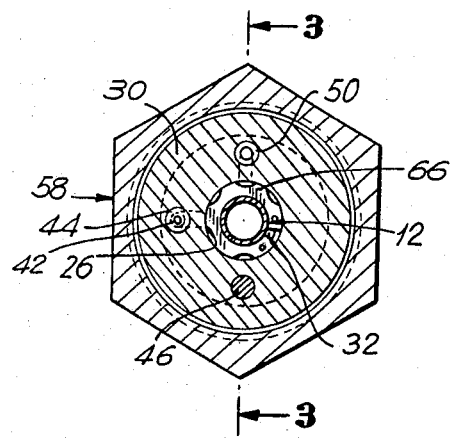
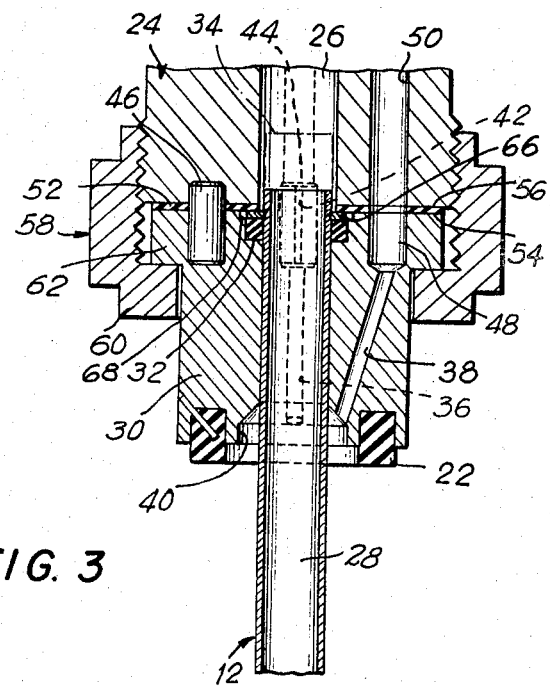
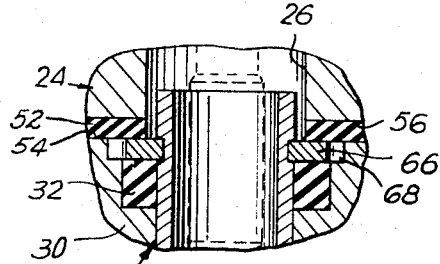
INVENTOR.
JAMES C. NORWOOD
BY
ATTORNEYS 3,450,175
BOTTLE FILLER TUBE
James C. Norwood, Stewart Manor, N.Y., assignor to Volckening, Inc., Brooklyn, N.Y., a corporation of New York
Filed July 28, 1966, Ser. No. 568,600
Int. Cl. B65b *1/04;* B67c *3/00*
U.S. Cl. 141—392                                    10 Claims

ABSTRACT OF THE DISCLOSURE

A filler tube apparatus for beverage bottle filler machines including a base housing having an aperture therein, a tube stem having a longitudinal aperture therethrough and having its upper portion disposed within said housing aperture, the lower portion of said tube stem extending therefrom and being adaptable for insertion into a beverage bottle, and a releasable retaining ring fixedly secured to said base housing and releasably mounted in a peripheral recess in the upper portion of said tube stem. The retaining ring is adapted to release the tube stem for upward movement thereby in the base housing aperture in response to an upward impact force on said tube stem.

---

The present invention relates to bottle filler valves and more particularly to a filler tube for a filler valve.

In high speed counter pressure bottle fillers, bottles to be filled are fed into stirrups which lift the bottles into engagement with the filler tube. As the stirrups lift the bottle, the lower end of the filler tube enters the neck of the bottle and extends towards the inside bottom surface of the bottle. The bottle is raised by the stirrups until the upper lip of the bottle contacts the sealing ring and is held in gas tight engagement therewith. The bottle is then filled with beverage from a filler valve connected to a filler bowl containing the bevarage. In such filler systems it sometimes happens that a bottle enters the filler stirrup off center, and when raised toward filling position causes the filler tube to hit the neck or body portions of the bottle. Since in filler valves heretofore made, the filler tube was rigidly secured to the base portion of the filler valve, generally screw-fastened, the striking of the body of the bottle caused the damaging of the filler tube and the bottle, as well as disruption of the filling process.

It is therefore an object of the present invention to provide in a beverage filler valve, a filler tube stem projecting downwardly therefrom capable of absorbing accidental impacts without causing damage to the filler tube stem or the bottle.

In accordance with the principles of the present invention there is provided a filler tube for a beverage filler valve. The filler tube apparatus comprises a base housing a longitudinal aperture therein and a filler tube stem disposed in said housing. The filler tube stem has its upper end in gas tight communication with the upper portion of the base housing aperture, with the lower end of the filler tube stem being adapted for insertion into a beverage bottle. A releasable retaining ring is fixedly secured to the base housing and releasably mounted in a peripheral recess in the upper end of the tube stem. A sealing ring is disposed in the base housing in sealing engagement with the peripheral surface of the filler tube.

The filler tube is upwardly slidably movable in the base housing aperture through the sealing ring, so that if the filler tube stem receives an accidental upward impact e.g. due to misalignment of the beverage bottle to be filled, the retaining ring snaps open to release the tube stem to permit the filler tube stem to move slideably upward in the base housing aperture.

The features of the invention which are believed to be novel are set forth with particularity in the appended claims. The invention itself, however, both as to its organization and method of operation, together with further objects and features thereof may best be understood with reference to the following description taken in conjunction with the accompanying drawings wherein:

FIG. 1 is an elevation view, partly in cross-section, showing a filler tube constructed in accordance with the present invention and as inserted into a beverage bottle during the filling operation.

FIG. 2 is a horizontal cross-section view through the upper portion of the filler tube shown in FIG. 1.

FIG. 3 is a vertical cross-section taken through the upper portion of the filler tube shown in FIG. 2.

FIG. 4 is an expanded sectional view of a portion of the filler tube apparatus shown in FIG. 3.

Referring to FIG. 1 there is shown a filler valve 10 having mounted therein a filler tube structure 11 comprising a hollow tube stem 12 which projects downwardly in the neck 16 of a bottle 18 to be filled. In high speed bottle filler systems, for which the preferred embodiment of the present invention is contemplated for use, the bottles to be filled are fed into stirrups (not shown) which lift the bottles 18, into engagement with the filler valve 10. As the stirrups lifts the bottle 18, the bottle neck is received in bell shape guide 15 which is slidably mounted on stem 12. Thus as the bottle 18 is lifted, the bottle upper lip 20 engages sealing ring 17 thereby pushing bell 15 upwardly until the top of bell 15 is in tight seating engagement with sealing ring 22, and bottle lip 20 is in gas tight sealing engagement with sealing ring 17 which is typically made of soft rubber.

Referring to FIG. 3 and FIG. 4, the filler valve 10 is shown to comprise a cylindrical upper housing 24 having a longitudinal opening 26 therethrough which is in coaxial communication with filler tube aperture 28 for the passage of air and other gases therethrough. Filler tube stem 12 is slidably mounted in the lower base housing 30 in coaxial alignment with opening 26, and has a rubber ring seal 32 mounted in a peripheral recess in base 30 so that ring 32 is in gas tight sealing engagement with the peripheral surface of stem 12. Although ring 32 is in sufficiently close engagement with stem 12 to prevent the escape of gas therepast, it permits stem 12 to slidably move upwardly and into opening 26 therepast upon the application of a suitable upward force to stem 12. There is mounted a snap action retaining ring 66 of the split ring type in a peripheral recess in the upper end of stem 12 which is operative upon the application of an upward impact to stem 12, to snap open to allow stem 12 to move upwardly into opening 26. Thus, if and when stem 12 is struck by a misaligned bottle, stem 12 moves upwardly into opening 26 and assumes the position shown by dotted outline 34.

An important feature of the present invention is thus demonstrated by the fact that stem 12 upon receiving an upwardly directed impact due to a misaligned bottle, rather than rigidly attempting to withstand the impact without giving way, as in the case of screw mounted vent tube stem heretofore used, tends to cushion the impact by moving upwardly into opening 26. As pointed out above, the absorption of the upward impact by the stem, prevents the lower portion of stem 12 from being bent or damaging a misaligned bottle. It is clear that stem 12 after being pushed upwardly into opening 26 is easily reset to its normal position by manually drawing it downward.

Lower base 30 has in the vertical sides thereof an aperture 36 for passage of gas therethrough and aperture 38 for conveying beverage therethrough. Aperture 36 extends at its lower end into an enlarged aperture 40, which communicates with the interior of bottle 12 at its upper lip 20, and at its upper end with aperture 42 in cylindrical alignment pin 44. Base 30 has a second cylindrical alignment pin 46 which extends into the corresponding cylindrical recess in upper housing portion 24. Aperture 38 extends at its upper end into an enlarged aperture 48 which communicates with the corresponding vertical aperture 50 in upper base housing 24, for the selective passage of beverage therethrough from the bowl (not shown) containing the supply of beverage.

A gasket 52 is seated between the upper surface 54 of lower base portion 30 and the lower surface 56 of upper base portion 24 so as to prevent the escape of liquid or gas between surface 54 and 56. A retaining nut 58 having an annular flange 60 at its lower end and a screw threaded upper portion, is operative to secure lower base portion 30 with upper base portion 24. Flange 60 at its upper surface abuts the lower surface of the outstanding annular collar 62 of lower base 30. Flange 60 is screw threaded into the lower end portion of upper base housing 24 thus urging collar 62 into pressing engagement with gasket 52 and surface 56. Accordingly, upper base portion 24 and lower base portion 30 are secured together in liquid and gas tight sealing engagement.

When the filler tube structure 11 is assembled, retaining ring 66 is maintained between gasket 52 and sealing ring 32 in annular groove 68 formed in the upper surface 54 of lower base portion 30. When so disposed, the retaining ring maintains tube stem 12 in its normal operative position, the lower portion thereof extending out of enlarged aperture 40 at the bottom of lower base 30. Retaining ring 66 is operative, upon the application of an upward impact to stem 12, such as may occur in the case of a misaligned bottle, to snap open to thereby release stem 12 and allow it to move upwardly into opening 26. Annular groove 68 is of a greater external diameter than retaining ring 66 so as to accommodate said ring when it snaps open upon the application of an upward impact to said tube stem, the retaining ring being maintained between gasket 52 and sealing ring 32 while the tube stem 12 moves upwardly into aperture 26. In this way, rather than having stem 12 absorb the impact and causing it to be damaged, stem 12 slidably moves upwardly into opening 26. After stem 12 moves upwardly into opening 26 to assume the position shown by dotted outline 34, the filling process stops and stem 12 is reset to its normal position by drawing it downward and causing retaining ring 66 to snap into its position around stem 12. Thus, when bottle 18 is being filled, beverage is directed from the filling bowl (not shown) downwardly through aperture 50, through the passageway sealed by gasket 52, through aperture 48 which communicates with aperture 50 through aperture 38 which has a reduced bore, and thence through enlarged aperture 40, with the beverage flowing down the peripheral surface of filler tube stem 12 and into bottle 18.

While there has been shown a particular embodiment of the present invention it will be understood that it is not wished to be limited thereto, since modifications can be made in the structure of the filler tube stem and base housing apertures and it is contemplated in the appended claims to cover any such modification as fall within the true spirit and scope of this invention.

What is claimed to be novel and desired to be secured by U.S. Letters Patent is:

1. In a filler valve for a beverage bottle filler machine, filler tube apparatus comprising, a base housing having a bore therein, a tube stem slidably received within said housing bore and having a longitudinal bore therethrough, sealing means providing a fluid tight connection between the upper portion of the tube stem and the housing bore, the lower portion of said tube stem being adaptable for insertion into said beverage bottle, and a retaining means clamped within said housing bore for releasably retaining the upper portion of said tube stem within said housing bore such that said retaining means will release said tube stem for upward movement within said housing bore in response to an upward impact force on the lower portion of said tube stem whereby said impact is absorbed without damage to said tube stem.

2. Filler tube apparatus as recited in claim 1 wherein said tube stem is formed with a peripheral recess on the upper portion thereof, said retaining means including a split retaining ring mounted in said recess and operative to snap open to release said tube stem upon the application of said upward impact force on said tube stem.

3. Filler tube apparatus as defined in claim 2 wherein said base housing comprises upper and lower housing portions fixedly assembled, said upper and lower housing portions having bores therein in coaxial alignment, said tube stem upper portion being disposed substantially in said lower base housing bore and having the lower portion thereof protruding downwardly therefrom, said sealing means being disposed in said lower base housing, said tube stem being operative, upon the application thereto at said protruding lower portion thereof, of said upward impact force, to slidably move upwardly in said upper housing bore thereby absorbing said impact without damage to said tube stem.

4. Apparatus as defined in claim 3 wherein said lower base housing at the upper end thereof comprises a collar having upper and lower surfaces, and further including a retaining nut at the upper end thereof in screw threaded engagement with said upper bore housing, said lower base housing at its lower end having a flange in abutting engagement with the lower surface of said collar thereby fixedly securing said upper housing with said lower base housing.

5. Apparatus as defined in claim 4 wherein said upper base housing has a vertical beverage aperture for the passage of beverage therethrough, said lower base housing having a substantially vertical beverage aperture in coaxial cooperation engagement with said upper base housing beverage aperture for the passage of beverage therethrough, an enlarged opening extending from the lower end of said lower base housing beverage aperture, said lower base housing stem and beverage aperture extending into said enlarged opening, whereby beverage is directed through said upper and lower base housing beverage apertures respectively and thence through said enlarged opening into said beverage bottle.

6. Apparatus as defined in claim 5 wherein said upper base housing has at least one cylindrical recess extending from the lower surface of said upper base housing, said lower base housing having at least one alignment pin vertically extending from the upper surface of said lower base housing into said cylindrical recess to thereby align said upper and lower base housing stem apertures and said upper and lower base housing beverage apertures respectively.

7. Apparatus as defined in claim 6 wherein said retaining pin has a substantially vertical aperture extending therethrough, said lower base housing has a second substantially vertical aperture extending from said enlarged opening into coaxial engagement with said retaining pin aperture, for passage of gas therethrough.

8. Apparatus as defined in claim 5 wherein there is further included a gasket between the upper surface of said lower base housing and the lower surface of said upper base housing to provide gas tight communcation between said upper and lower base housing stem apertures and between said upper and lower base housing beverage apertures.

9. Apparatus as defined in claim 2, wherein the upper surface of said lower base housing is formed with an annular groove extending from said lower base housing bore and adapted to receive said retaining ring in both its normal and snapped open positions.

10. Apparatus as defined in claim 9, including a gasket between the upper surface of said lower base housing and the lower surface of said upper base housing, said retaining ring being clamped between the lower surface of said gasket and the upper surface of said sealing ring.

References Cited

UNITED STATES PATENTS

| 2,679,346 | 5/1954 | Breeback | 141—48 X |
| 3,079,188 | 2/1963 | Oswold | 285—321 X |

FOREIGN PATENTS

| 386,489 | 1/1933 | Great Britain. |
| 836,317 | 6/1960 | Great Britain. |
| 80,867 | 5/1963 | France. |

LAVERNE D. GEIGER, *Primary Examiner.*

EDWARD J. EARLS, *Assistant Examiner.*

U.S. Cl. X.R.

285—2